Patented May 15, 1945

2,376,286

UNITED STATES PATENT OFFICE 2,376,286

PROCESS OF MAKING LONG CHAIN INTERMEDIATES

Lee Irvin Smith, Minneapolis, Minn., and George F. Rouault, Whiting, Ind., assignors to Regents of The University of Minnesota, Minneapolis, Minn., a corporation of Minnesota No Drawing. Application March 11, 1944, Serial No. 526,127

5 Claims. (Cl. 260—657)

The present invention relates to the production of long chain aliphatic compounds, and more particularly long chain aliphatic compounds having recurring "isoprene" units,

—CH$_2$CH(CH$_3$)CH$_2$CH$_2$— which are especially adapted for the synthesis of tocopherol and tocopherol-like compounds.

The synthesis in quantity of long chain compounds, particularly those carrying substituents on the chain, is a matter of considerable difficulty. The number of steps is usually large, and only too often some one or more steps in the synthesis give very poor yields so that, from the point of view of quantity production of these complicated compounds, most of the known syntheses are not satisfactory. In the synthesis of these complicated compounds the chances of commercial success are much better when larger fragments are combined to produce the desired compound.

In the present invention advantage is taken of this fact by combining two fragments of considerable size in a particular manner such that by a few subsequent reactions it is possible to arrive at satisfactory yields of the desired complicated aliphatic compound. To this end the invention contemplates the reaction of 2,6-dimethylheptanoic acid with p-cresol followed by a series of reactions resulting in the production of the aliphatic halide RX where R is

H[CH$_2$CH(CH$_3$)CH$_2$CH$_2$]$_3$CH$_2$—

This halide is useful in the synthesis of tocopherol as will be shown hereinafter.

It is therefore an object of the present invention to provide a process of preparing complicated long chain aliphatic compounds with substituents on the chain, and particularly to provide a method of making a compound having the structure H[CH$_2$CH(CH$_3$)CH$_2$CH$_2$]$_3$CH$_2$X.

It is another object of the invention to prepare such compounds in satisfactory yields by combining large fragments of such compounds and further processing the combination, all in a prescribed manner, to yield the desired product.

It is a further object to prepare such compounds from readily available naturally occurring raw materials. Other objects of the invention will appear from the following description of the invention.

In the copending application of the present inventors filed of even date herewith and entitled "Method of making aliphatic intermediates," it was shown that certain naturally occurring aliphatic compounds such as citronellol can be converted into compounds of the type R$_1$COX, where R$_1$ is (CH$_3$)$_2$CHCH$_2$CH$_2$CH$_2$CH(CH$_3$)— and X is halogen, OH or other group capable of esterifying an alcoholic OH group. In the present invention, the two potential "isoprene" groups of this dimethylheptanoic acid are employed in conjunction with the potential "isoprene" group of p-cresol to prepare the halide, 4,8,12-trimethyltridecyl bromide, referred to above.

The general procedure followed in carrying out the invention is illustrated by the following reactions: (R$_1$ is 6-methylheptyl-2)

 + R$_1$COCl  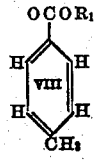

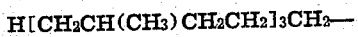

Fries rearrangement

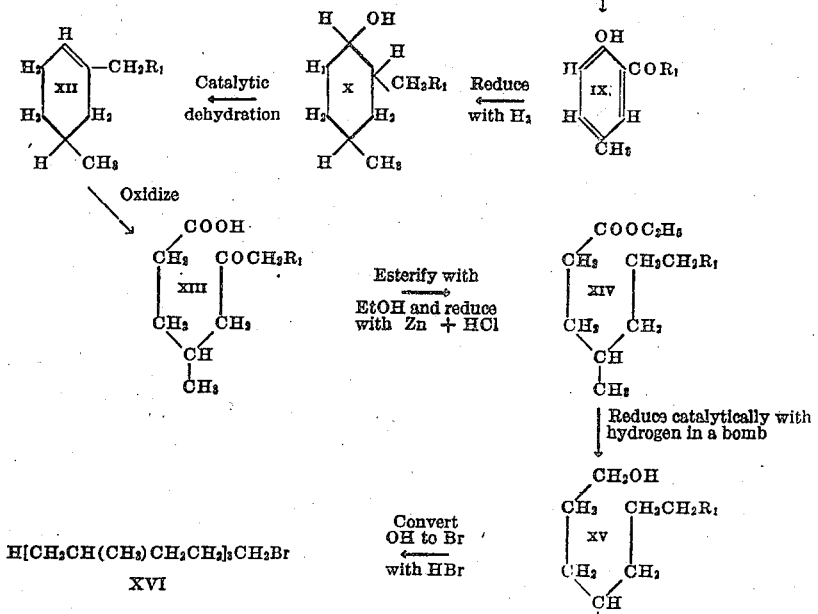

For esterification of the p-cresol other forms of the acid group may be used but the acyl halide was found highly desirable in view of the fact that the ester VII, so formed, is in the preferred form of the process subjected to a Fries rearrangement with AlCl₃ without isolation of the ester. It was found that the acyl cresol IX, may be reduced practically quantitatively to the alkyl cyclohexanol X, by a two stage hydrogenation under 1800-2500 lbs. pressure in the presence of Raney nickel, first at 175° C. and then at 225° C. The reduction may be carried out in the absence of a solvent or in the presence of alcohol but unusually prolonged reaction times and elevated temperatures should be avoided to prevent hydrogenolysis and production of the disubstituted cyclohexane.

In the dehydration step two paths were possible. One of these would produce 5-methyl-3-nonyl-1-cyclohexene, a product useless for our purpose. The second path would produce 5-methyl-1-nonyl-1-cyclohexene (XII) the compound desired in the present synthesis. It was discovered that the dehydration could be caused to follow the second path and the present synthesis was thus feasible.

The cyclohexene XII may then be oxidized to break the ring and form the keto acid XIII. The action of ozone on the cyclohexene in ethyl bromide followed by the decomposition of the resultant ozonide by the action of hydrogen peroxide in acetic acid was found to produce the keto acid in 90% yield.

It was found that the keto acid XIII could be suitably reduced to the saturated acid and esterified to the ester XIV, this being accomplished simultaneously, for example, by a Clemmensen reduction in the presence of alcohol in yields of about 65%. This ester, by further and more drastic reduction, as for example hydrogenation at 250° C. under a pressure of 2800 lbs. in the presence of copper chromite catalyst, was converted into the alcohol XV in yields of about 85%. The bromide XVI was produced from the alcohol by the action of dry hydrogen bromide at 120° C.

The bromide so produced was converted to a Grignard reagent and this was then used to produce tocopherol and like compounds in accordance with the teachings of the copending applications of Smith and Sprung Ser. No. 453,279 filed August 1, 1942, and Ser. No. 456,791 filed August 31, 1942.

The following example will illustrate in detail the manner in which the several steps heretofore described may be carried out, it being understood, of course, that the example is merely illustrative.

*Example*

68.6 g. of freshly distilled p-cresol were placed in a one-liter, three-neck flask equipped with a Hershberg stirrer, a dropping funnel and an outlet tube. 75.5 g. aluminum chloride were added to the cresol and the mixture was heated in an oil bath for two hours at 130-140° C. 93 g. of 2,6-dimethylheptanoyl chloride were then added over a 10-minute period to the vigorously stirred mixture. The temperature was maintained at 145° C. and stirring was continued for a period of one and one-quarter hours. The cooled mixture was decomposed by the action of 400 cc. of boiling hydrochloric acid (18%). The oil was removed and fractionated. After a forerun of 5.3 g. having a boiling point of 104° C. at 3 mm. was removed, 90.8 g. (69% yield) of the acyl cresol IX having a boiling point of 144° C. at 3 mm. were obtained.

79.5 g. of the above acyl cresol, 85 cc. of dry ethanol and 21 g. of a Raney nickel catalyst were mixed and heated at 195° C. for two hours under a hydrogen pressure of 1700-3700 lbs. The cooled mixture was filtered and the alcohol was removed from the filtrate by distillation under slightly reduced pressure. The residue was heated with 9 g. of a Raney nickel catalyst for four hours at 175° C. under a hydrogen pressure of 1700-2400 lbs. The catalyst was removed and the product was distilled. 74.0 g. (96% yield) of the cyclohexanol X having a boiling point of 133° C. at 3 mm. were obtained.

22.3 g. of this cyclohexanol together with 2.3 g. of p-toluenesulfonic acid were heated for fifteen minutes at 180° C. in a metal bath. The cooled mixture was dissolved in ether and the ethereal solution was washed successively with water, sodium hydroxide (10%) and again with water. The solvent was removed and the residue was distilled to yield 18 g. (87%) of the cyclohexene XII having a boiling point of 141° C. at 15 mm. pressure.

13.9 g. of the cyclohexene XII, dissolved in 300 cc. of ethyl bromide, were subjected for five hours to the action of a 5 liter per hour stream of ozonized oxygen containing 6% of $O_3$. 200 cc. of acetic acid were added to the mixture and the ethyl bromide was removed by distillation on a steam bath. 30 cc. of 30% hydrogen peroxide were added and the mixture was heated for two hours on a steam bath. The solution was diluted with 600 cc. of water and extracted with two 100 cc. portions of ether. The combined extracts were washed with water, acidified ferrous sulfate solution (2%) and again with water. The solvent was removed and the product was distilled to yield 15.6 g. (92%) of the keto acid XIII, having a boiling point of 170° C. at 4 mm. pressure.

4.8 g. of this keto acid were dissolved in 110 cc. dry ethanol which had been saturated with hydrogen chloride. The solution was refluxed for forty hours with 100 g. of amalgamated zinc. Twice during this period, hydrogen chloride was passed into the mixture until it was saturated. The mixture was poured into 600 cc. of water and the oil was removed, washed with water, and distilled. 3.6 g. (71% yield) of the ester XIV, ethyl 4,8,12-trimethyltridecanoate, having a boiling point of 160° C. at 3 mm. pressure were obtained.

The ester XIV in the amount of 10.55 g. was heated with 2.0 g. of copper chromite catalyst at 250° C. for five hours under a hydrogen pressure of 2800 lbs. The mixture was washed out of the bomb with 50 cc. alcohol, the solution was filtered, and the alcohol was distilled from the filtrate under 15 mm. pressure. The yield was 7.4 g. (85%) of alcohol XV, 4,8,12-trimethyl-1-tridecanol, having a boiling point of 140° C. at 3 mm. pressure.

The alcohol XV was converted to the bromide as follows: Dry hydrogen bromide (from a 1 mm. orifice, 4 bubbles per second) was passed through 7.7 g. of the alcohol XV at 120° C. for one and one-quarter hours. The product was washed successively with 4 cc. sulfuric acid, 50 cc. aqueous methanol, and water and dried over calcium chloride and fractionated. 5.5 g. (57% yield) of bromide XVI, 1-bromo-4,8,12-trimethyltridecane, having a boiling point of 135° C. at 2–3 mm. pressure were obtained. The bromide had an index of refraction $n_D^{25}$ 1.4560.

It is to be understood that the above detailed steps are illustrative only and while the invention is preferably carried out in this manner, other ways of effecting the individual steps in the sequence may be employed without departing from the plan of the invention and without departing from the spirit of the invention, as set forth in the appended claims.

What we claim is:

1. Process of producing 1-halo-4,8,12-trimethyltridecane which comprises esterifying p-cresol by means of a compound having a 2,6-dimethylheptanoyl group, rearranging the ester to the ortho acylcresol, 2[2',6'-dimethylheptanoyl]-4-methylphenol, reducing said acylcresol to the corresponding cyclohexanol, 2[2',6'-dimethylheptyl]-4-methylcyclohexanol, dehydrating said cyclohexanol to the cyclohexene, 5-methyl-1-[2',6'-dimethylheptyl]-1-cyclohexene, oxidizing said cyclohexene to the corresponding keto acid, 4,8,12-trimethyl-6-ketotridecanoic acid, reducing and esterifying the keto acid to a 4,8,12-trimethyltridecanoate, reducing the ester to the corresponding alcohol, and converting the alcohol to the 1-halo-4,8,12-trimethyltridecane.

2. Process of producing 1-bromo-4,8,12-trimethyltridecane which comprises esterifying p-cresol by means of a compound having a 2,6-dimethylheptanoyl group, rearranging the ester to the ortho acylcresol, 2[2',6'-dimethylheptanyol]-4-methylphenol, reducing said acylcresol to the corresponding cyclohexanol, 2[2',6'-dimethylheptyl]-4-methylcyclohexanol, dehydrating said cyclohexanol to the cyclohexene, 5-methyl-1-[2',6'-dimethylheptyl]-1-cyclohexene, oxidizing said cyclohexene to the corresponding keto acid, 4,8,12-trimethyl-6-ketotridecanoic acid, reducing and esterifying the keto acid to a 4,8,12-trimethyltridecanoate, reducing the ester to the corresponding alcohol, and converting the alcohol to the 1-bromo-4,8,12-trimethyltridecane.

3. Process of producing 1-halo-4,8,12-trimethyltridecane which comprises esterifying p-cresol by means of a 2,6-dimethylheptanyol halide, rearranging the ester to the ortho acylcresol, 2[2',6'-dimethylheptanoyl]-4-methylphenol, reducing said acylcresol to the corresponding cyclohexanol, 2[2',6'-dimethylheptyl]-4-methylcyclohexanol, dehydrating said cyclohexanol to the cyclohexene, 5-methyl-1-[2',6'-dimethylheptyl]-1-cyclohexene, oxidizing said cyclohexene to the corresponding keto acid, 4,8,12-trimethyl-6-ketotridecanoic acid, reducing and esterifying the keto acid to a 4,8,12-trimethyltridecanoate, reducing the ester to the corresponding alcohol, and converting the alcohol to the 1-halo-4,8,12-trimethyltridecane.

4. Process of producing 1-halo-4,8,12-trimethyltridecane which comprises esterifying p-cresol by means of a compound having a 2,6-dimethylheptanoyl group, rearranging the ester to the ortho acylcresol, 2[2',6'-dimethylheptanoyl]-4-methylphenol, reducing said acylcresol to the corresponding cyclohexanol, 2[2',6'-dimethylheptyl]-4-methylcyclohexanol, dehydrating said cyclohexanol to the cyclohexene, 5-methyl-1-[2',6'-dimethylheptyl]-1-cyclohexene, oxidizing said cyclohexene to the corresponding keto acid, 4,8,12-trimethyl-6-ketotridecanoic acid, reducing and esterifying the keto acid to ethyl-4,8,12-trimethyltridecanoate, reducing the ester to the corresponding alcohol, and converting the alcohol to the 1-halo-4,8,12-trimethyltridecane.

5. Process of producing 1-halo-4,8,12-trimethyltridecane which comprises esterifying p-cresol by means of a 2,6-dimethylheptanoyl halide, heating the ester in the presence of aluminum chloride to rearrange the ester to the ortho acylcresol 2[2',6'-dimethylheptanoyl]-4-methylphenol, reducing said acylcresol to the corresponding cyclohexanol, 2[2',6'-dimethylheptyl]-4-methyl cyclohexanol, dehydrating said cyclohexanol in the presence of p-toluenesulfonic acid as a catalyst to the cyclohexene, 5-methyl-1-[2',6'-dimethylheptyl]-1-cyclohexene, ozonizing said cyclohexene to the corresponding keto acid, 4,8,12-trimethyl-6-ketotridecanoic acid, reducing and esterifying the keto acid to a 4,8,12-trimethyltridecanoate, catalytically reducing the ester under pressure to the corresponding alcohol and converting the alcohol to the 1-halo-4,8,12-trimethyltridecane by means of dry hydrogen halide gas.

LEE IRVIN SMITH.
GEORGE F. ROUAULT.

CERTIFICATE OF CORRECTION.

Patent No. 2,376,286.  May 15, 1945.

LEE IRVIN SMITH, ET AL.

It is hereby certified that error appears in the printed specification requiring correction as follows: Page 2, in the formula, uppermost center portion thereof, for "$H_1$" read --$H_2$--; and that the said Letters Patent should be read with this correction therein that the same may conform to the record of the case in the Patent Office.

Signed and sealed this 16th day of October, A. D. 1945.

Leslie Frazer (Seal)  First Assistant Commissioner of Patents.